US007511760B2

(12) United States Patent
Otomo

(10) Patent No.: US 7,511,760 B2
(45) Date of Patent: Mar. 31, 2009

(54) VIDEO SIGNAL PROCESSOR AND METHOD FOR PROCESSING A VIDEO SIGNAL

(75) Inventor: Goichi Otomo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 640 days.

(21) Appl. No.: 11/262,745

(22) Filed: Nov. 1, 2005

(65) Prior Publication Data
US 2006/0098121 A1    May 11, 2006

(30) Foreign Application Priority Data
Nov. 11, 2004    (JP) ............................... 2004-327866

(51) Int. Cl.
*H04N 7/01*   (2006.01)
(52) U.S. Cl. ..................................... 348/443
(58) Field of Classification Search ............... 348/443, 348/459, 504, 509, 454, 458
See application file for complete search history.

(56) References Cited

U.S. PATENT DOCUMENTS

| 5,917,950 | A | * | 6/1999 | Yim ............................. 382/236 |
| 6,118,491 | A | * | 9/2000 | Wu et al. ..................... 348/526 |
| 6,118,818 | A | * | 9/2000 | Min et al. ............... 375/240.12 |
| 6,151,075 | A | * | 11/2000 | Shin et al. .................... 348/459 |
| 6,445,419 | B1 | | 9/2002 | Sanpei |
| 6,621,523 | B2 | * | 9/2003 | Obitsu ......................... 348/552 |
| 6,924,821 | B2 | * | 8/2005 | Trinh et al. .................. 345/629 |
| 7,411,617 | B2 | * | 8/2008 | Kume et al. ................. 348/239 |
| 2006/0041773 | A1 | * | 2/2006 | Otomo ......................... 713/503 |

* cited by examiner

*Primary Examiner*—Paulos M Natnael
(74) *Attorney, Agent, or Firm*—Oblon, Spivak, McClelland, Maier & Neustadt, P.C.

(57) ABSTRACT

A video signal processor includes a synchronization signal generator configured to generate a first internal synchronization signal corresponding to a standard of an input video signal, and to generate a second internal synchronization signal synchronized with the first internal synchronization signal. A first synchronizer is configured to synchronize the input video signal with the first internal synchronization signal, and to generate a first internal video signal. A second synchronizer is configured to synchronize the first internal video signal with the second internal synchronization signal, and to generate a second internal video signal by controlling the frame rate of the first internal video signal. A codec is configured to execute both decoding of an encoded video signal and encoding of the second internal video signal in designated time partitions within each cycle of the second internal synchronization signal.

20 Claims, 11 Drawing Sheets

VIDEO SIGNAL PROCESSOR AND METHOD FOR PROCESSING A VIDEO SIGNAL

CROSS REFERENCE TO RELATED APPLICATION AND INCORPORATION BY REFERENCE

This application is based upon and claims the benefit of priority from prior Japanese Patent Application P2004-327866 filed on Nov. 11, 2004; the entire contents of which are incorporated by reference herein.

BACKGROUND OF THE INVENTION

1. Field of the Invention

The present invention relates to a video signal processor for executing encoding and decoding processes of a video signal.

2. Description of the Related Art

Video recording reproduction devices, such as a hard disk drive (HDD) recorders and a digital versatile disk (DVD) recorders, encode an input signal, and decode an encoded video signal, in accordance with standards such as the moving picture expert group (MPEG) 2. The encoding and decoding are contrary procedures, but the encoding and decoding processes of the MPEG 2 can be executed by similar hardware arrangements. It is desirable that the encoding and decoding processes are executed utilizing a codec that operates in synchronization with a single synchronization signal.

The analog color television broadcasting standards used around the world are broken down into the following: the national television system committee (NTSC) standard, the phase alternation by line (PAL) standard, and the sequential color with memory (SECAM) standard. In the NTSC standard, 30 frames are broadcasted per second by dividing a frame into 525 lines. In the PAL and SECAM standards, 25 frames are broadcasted per second by dividing a frame into 625 lines.

As described above, the synchronization frequency of the NTSC standard is 30 [Hz], and the synchronization frequency of the PAL standard and the SECAM standard is 25 [Hz]. The PAL standard and the NTSC standard are sometimes used together because locales such as Europe and China adopt the PAL standard, while the video-content-rich United States of America employs the NTSC standard. A video signal processor capable of generating an output video signal having a synchronization frequency of the PAL standard by decoding an encoded video signal of the NTSC standard has been proposed to solve the problem.

However, when the encoding and decoding processes are executed by utilizing a codec that operates in synchronization with a synchronization signal, it is difficult to deal with video signals having different synchronization frequencies in executing the encoding and decoding processes. That is, it is impossible to execute a decoding process of an encoded video signal that conforms to the NTSC standard, and an encoding of an input video signal that conforms to the PAL or SECAM standard, at the same time. Although it is possible to deal with video signals having different synchronization frequencies by preparing both an encoder and a decoder which utilizes different synchronization signal, the hardware scale and power consumption of the video signal processor increases.

SUMMARY OF THE INVENTION

An aspect of the present invention inheres in a video signal processor encompassing a synchronization signal generator configured to generate a first internal synchronization signal corresponding to a standard of an input video signal, and to generate a second internal synchronization signal synchronized with the first internal synchronization signal, a first synchronizer configured to synchronize the input video signal with the first internal synchronization signal, and to generate a first internal video signal, a second synchronizer configured to synchronize the first internal video signal with the second internal synchronization signal, and to generate a second internal video signal by controlling the frame rate of the first internal video signal, and a codec configured to execute both decoding of an encoded video signal and encoding of the second internal video signal in designated time partitions within each cycle of the second internal synchronization signal.

Another aspect of the present invention inheres in a method for processing a video signal, encompassing generating a first internal synchronization signal corresponding to a standard of an input video signal, generating a second internal synchronization signal synchronized with the first internal synchronization signal, generating a first internal video signal by synchronizing the input video signal with the first internal synchronization signal, synchronizing the first internal video signal with the second internal synchronization signal, generating a second internal video signal by controlling the frame rate of the first internal video signal, and executing both decoding of an encoded video signal and encoding of the second internal video signal in designated time partitions within each cycle of the second internal synchronization signal.

DETAILED DESCRIPTION OF THE INVENTION

Figure 1:
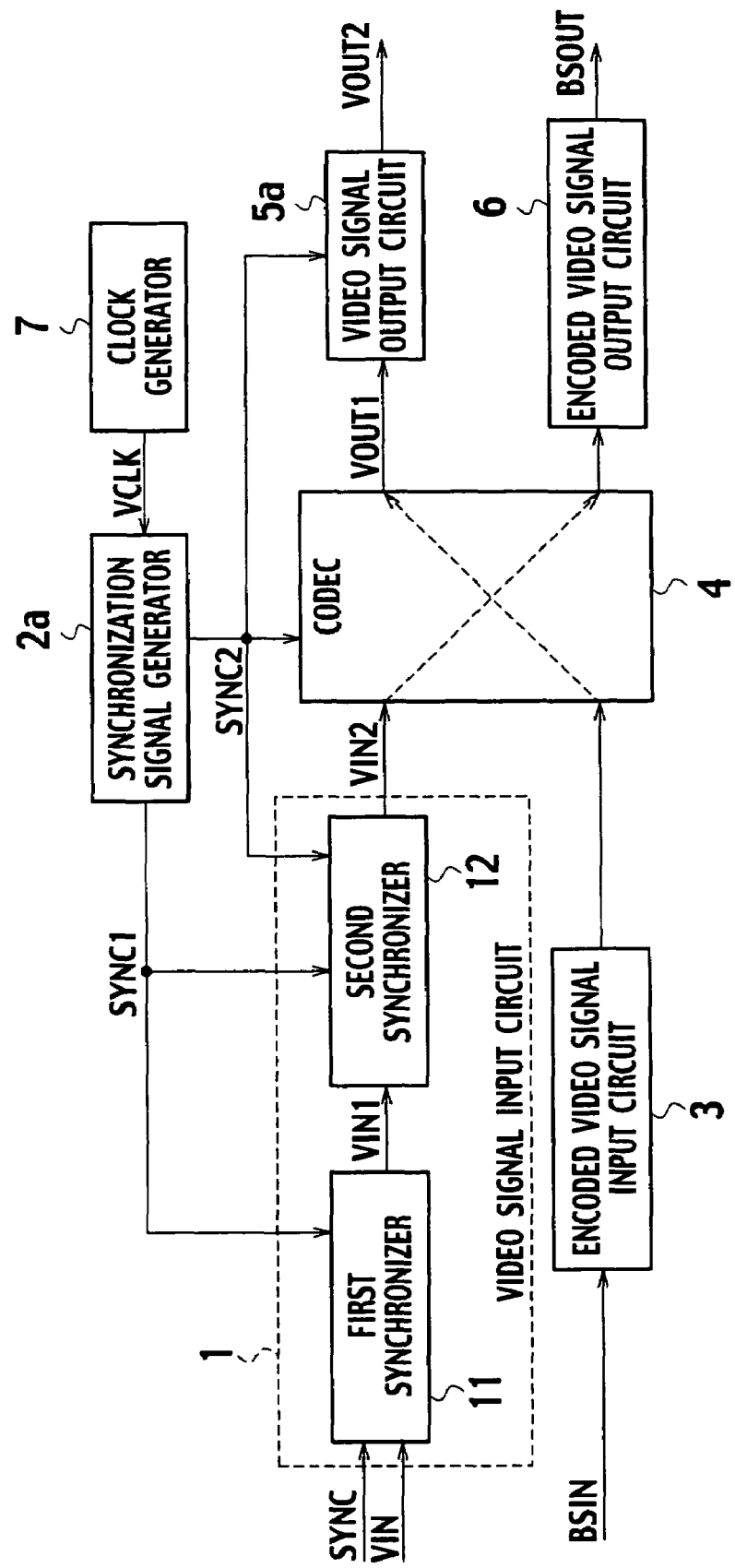
FIG. 1 is a block diagram showing a video signal processor according to a first embodiment of the present invention.
Figure 2:
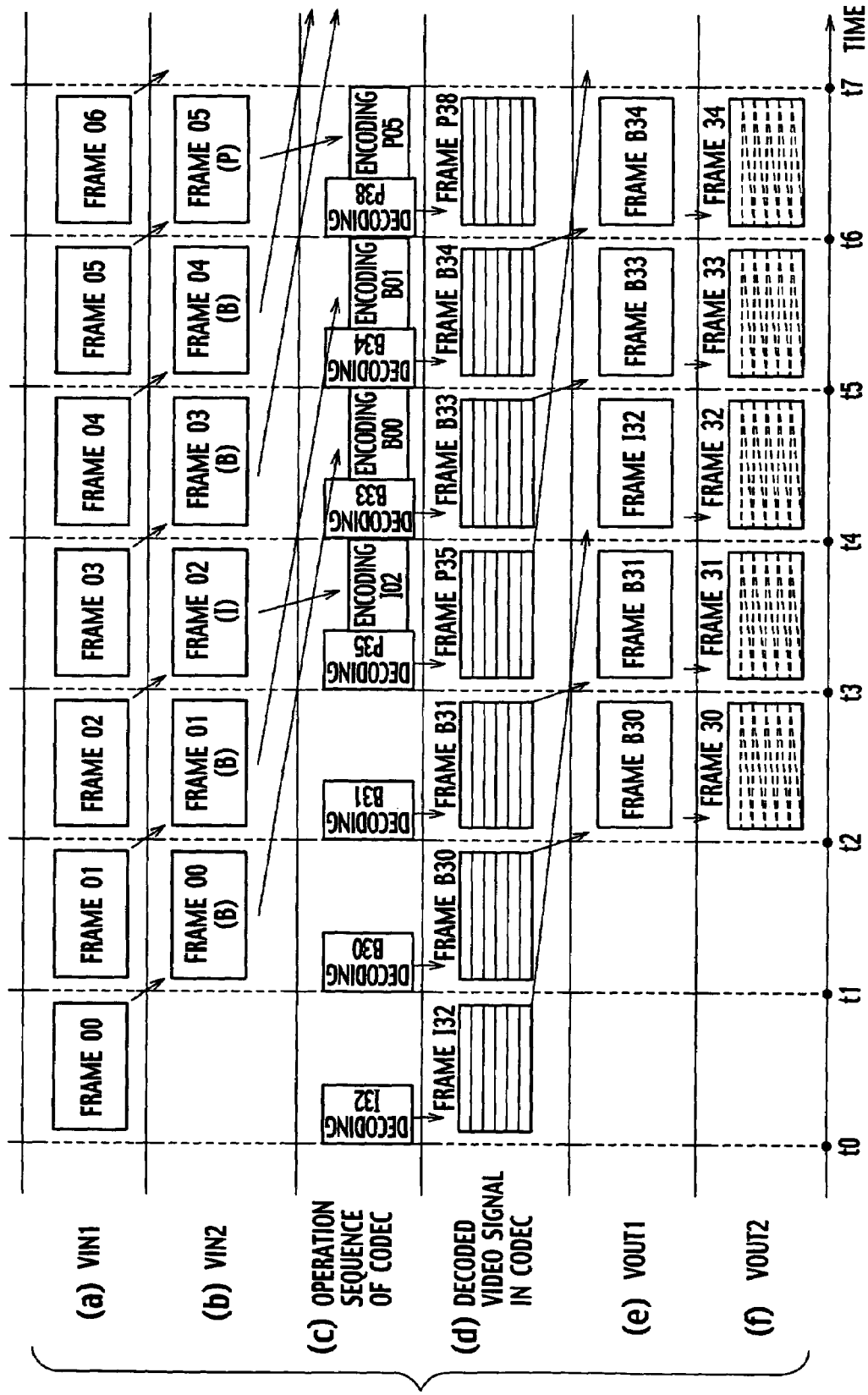
FIG. 2 is a time chart showing an operation of the video signal processor according to the first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" define a state in which first and second elements are electrically connected to each other without regard to whether or not there is a physical connection between the elements.

FIRST EMBODIMENT

As shown in FIG. 1, a video signal processor according to a first embodiment of the present invention includes a video signal input circuit 1, an encoded video signal input circuit 3, a codec 4, a video signal output circuit 5a, an encoded video signal output circuit 6, a synchronization signal generator 2a, and a clock generator 7. The video signal input circuit 1 includes first and second synchronizers 11 and 12. The synchronization signal generator 2a generates both a first internal synchronization signal SYNC1 corresponding to a standard of an input video signal VIN, and generates a second internal synchronization signal SYNC2 synchronized with the first internal synchronization signal SYNC. The first synchronizer 11 synchronizes the input video signal VIN with the first internal synchronization signal SYNC1, and generates a first internal video signal VIN1. The second synchronizer 12 synchronizes the first internal video signal VIN1 with the second internal synchronization signal SYNC2, and generates a second internal video signal VIN2 by controlling the frame rate of the first internal video signal VIN1. The codec 4 executes both decoding of an encoded video signal BSIN and encoding of the second internal video signal VIN2 in designated time partitions within each cycle of the second internal synchronization signal SYNC2. The "encoded video signal BSIN" refers to a video signal encoded to MPEG standard, for instance.

A MPEG codec that conforms to the MPEG standard can be utilized as the codec 4. A frame synchronization signal or a field synchronization signal can be utilized as the first and second internal synchronization signals SYNC1 and SYNC2. Since a frame has two fields, the frequency of the field synchronization signal is twice as high as the frequency of the frame synchronization signal.

A receiver, such as an analog television tuner, is connected to an input of the first synchronizer 11, for instance. The input video signal VIN includes an input synchronization signal SYNC. A synchronization signal extractor (not illustrated) extracts the input synchronization signal SYNC from the input video signal VIN. An input of the encoded video signal input circuit 3 is connected to a DVD player or a digital television tuner, for instance.

An input of the synchronization signal generator 2a is connected to an output of the clock generator 7. An input of the second synchronizer 12 is connected to each output of the first synchronizer 11 and the synchronization signal generator 2a. An input of the codec 4 is connected to each output of the second synchronizer 12, the encoded video signal input circuit 3, and the synchronization signal generator 2a. An input of the video signal output circuit 5a is connected to each output of the codec 4 and the synchronization signal generator 2a. An input of the encoded video signal output circuit 6 is connected to an output of the codec 4.

Output of the encoded video signal output circuit 6 is connected to a recorder, such as a HDD or a DVD drive, for instance. Output of the video signal output circuit 5a is connected to a display device, such as a television set, for instance.

The first synchronizer 11 and the second synchronizer 12 include a frame buffer, and a controller (not illustrated) configured to control writing and reading of the frame buffer. The input video signal VIN supplied to the first synchronizer in units of Fields is sequentially stored by the first synchronizer in units of frames. The controller reads out the stored input video signal VIN in synchronization with the first internal synchronization signal SYNC1.

The first synchronizer 11 performs a skip operation or a repeat operation of frames so as to keep the memory capacity of the frame buffer constant. Here, the "skip operation" refers to an operation that does not output a frame. The "repeat operation" refers to an operation continuously outputting the same frame twice. Or, the controller detects the phase difference of two inputted synchronization signals, and performs the skip operation or the repeat operation of frames in accordance with the phase difference.

A frame synchronization signal or a field synchronization signal of the same standard is used as the input synchronization signal SYNC and the first internal synchronization signal SYNC1. That is, the first internal synchronization signal SYNC1 is set to a frame synchronization signal or a field synchronization signal of the PAL standard when the input synchronization signal SYNC is a frame synchronization signal or a field synchronization signal of the PAL standard.

Since the input synchronization signal SYNC is generated by an external device, a phase error from a nominal value occurs when the input synchronization signal SYNC is transmitted to the first synchronizer 11. Furthermore, the transmission of the input synchronization signal SYNC may be suspended because of a suspension of the external device. Therefore, the first synchronizer 11 synchronizes the input video signal VIN with the first internal synchronization signal SYNC1 so as to correct the phase error between the input video signal VIN and the input synchronization signal SYNC.

On the other hand, the second synchronizer 12 has a function for converting the frame rate of the first internal video signal VIN1, in addition to a function for synchronizing the first internal video signal VIN1 with the second internal synchronization signal SYNC2. Since the first internal synchronization signal SYNC1 and the second internal synchronization signal SYNC2 synchronize each other, the second synchronizer 12 is able to perform a desired conversion sequence of the frame rate. The second synchronizer 12 executes the conversion of the frame rate by executing the repeat operation or the skip operation to the first internal video signal VIN1 at a specific timing during a period when each phase of the first internal synchronization signal SYNC1 and the second internal synchronization corresponds. A detailed operation of the second synchronizer 12 will be described later.

The encoded video signal input circuit 3 receives the encoded video signal BSIN, and transmits the encoded video signal BSIN to the codec 4. The encoded video signal input circuit 3 extracts a clock component, i.e., a program clock reference (PCR) or a system clock reference (SCR), included in the encoded video signal BSIN when the encoded video signal BSIN is encoded in accordance with the MPEG2 standard.

The clock generator 7 includes a crystal oscillator (XO) or a voltage controlled crystal oscillator (VCXO), for instance. When the clock generator 7 generates the reference clock VCLK based on the PCR or the SCR, the VCXO is required.

The video signal output circuit 5a transmits the encoded video signal BSIN decoded by the codec 4 to the external devices as a decoded video signal VOUT1 in synchronization with the second internal synchronization signal SYNC2. The encoded video signal output circuit 6 transmits the second internal video signal VIN2 encoded by the codec 4 to the external devices as an encoded output signal BSOUT.

For example, the synchronization signal generator 2a includes two dividers having a variable dividing ratio or two phase locked loop (PLL) circuits configured to generate the first internal synchronization signal SYNC1 and the second internal synchronization signal SYNC2, based on the reference clock VCLK. Since an analog color television broadcast standard employs a synchronization frequency of 25 [Hz] or 30 [Hz], the frequency of the first internal synchronization signal SYNC1 is set to 25 [Hz] or 30 [Hz] when the first synchronizer 11 executes a synchronization process in each frame, for instance. Similarly, the frequency of the second internal synchronization signal SYNC2 is set to 25 [Hz] or 30 [Hz], for instance.

Here, when the frequency of the second internal synchronization signal SYNC2 is set to 30 [Hz] which is a synchronization frequency (vertical synchronous frequency) of the NTSC standard, it is possible for the second synchronizer 12 to operate without losing frames in processing the input video signal VIN having lower synchronization frequency than NTSC standard, such as the PAL standard or the SECAM standard.

Next, an operation of the video signal processor according to the first embodiment will be described by referring time charts shown in FIG. 2 to FIG. 6. With respect to the time charts shown in FIG. 2 to FIG. 6, frame synchronization signals are utilized as the input synchronization signal SYNC, the first internal synchronization signal SYNC1, and the second internal synchronization signal SYNC2. That is, the first synchronizer 11 and the second synchronizer 12 execute the synchronization process for each frame. The codec 4 executes the decoding and encoding processes in a designated time partition of each frame cycle.

At first, the description will be given with regard to an example in which each phase of the input synchronization signal SYNC, the first internal synchronization signal SYNC1, and the second internal synchronization signal SYNC2 are equal. In this case, the first synchronizer 11 and the second synchronizer 12 execute neither a synchronization of frames nor a conversion of the frame rate.

As shown in a period from time t0 to t1 of FIG. 2(a), the second synchronizer 12 once holds a frame 00 transmitted from the first synchronizer 11. In the period from time t0 to t1 of FIG. 2(c), the codec 4 decodes an intra picture (I picture) I32 transmitted from the external devices via the encoded video signal input circuit 3. The "I picture" refers to a picture encoded within a frame. As a result, a frame I32 is generated in the codec 4, as shown in a period from time t0 to t1 of FIG. 2(d).

As shown in a period from time t1 to t2 of FIG. 2(a), the second synchronizer 12 once holds a frame 01 transmitted from the first synchronizer 11. At the same time, the second synchronizer 12 transmits frame 00 held in the period from time t0 to t1 to the codec 4, as shown in the period from time t1 to t2 of FIG. 2(b). The codec 4 decodes a bi-directional picture (B picture) B30, and generates a frame B30 in a part of the period from time t1 to t2 of FIG. 2(c) and (d). The "B picture" refers to a picture generated by the difference between the before and after I picture or predictive picture (P picture).

As shown in a period from time t2 to t3 of FIG. 2(a), the second synchronizer 12 once holds frame 02 transmitted from the first synchronizer 11. The second synchronizer 12 transmits frame 01 held in the period from time t1 to t2 to the codec 4, as shown in a period from time t2 to t3 of FIG. 2(b). The codec 4 decodes a B picture B31, and generates a frame B31 in a part of the period from time t2 to t3 of FIG. 2(c) and (d).

As shown in a period from time t3 to t4 of FIG. 2(a), the second synchronizer 12 once holds frame 03 transmitted from the first synchronizer 11. The second synchronizer 12 transmits frame 02 held in the period from time t2 to t3 to the codec 4, as shown in a period from time t3 to t4 of FIG. 2(b). The codec 4 decodes a P picture P35, and generates a frame P35 in a part of the period from time t3 to t4 of FIG. 2(c) and (d). The term "P picture" refers to a picture generated by the difference with other pictures. The codec 4 encodes the frame 02 in the remaining period from time t3 to t4 of FIG. 2(c) and (d). A period from time t4 to t5, a period from time t5 to t6, and a period from time t6 to t7 are similar to the period from time t3 to t4.

It is unnecessary to individually provide a decoder and an encoder because the codec 4 executes decoding and encoding processes in the same frame cycle, as shown in FIG. 2(c). Therefore, a video signal processor capable of reducing power consumption, hardware scale, and cost is realized.

Figure 3:
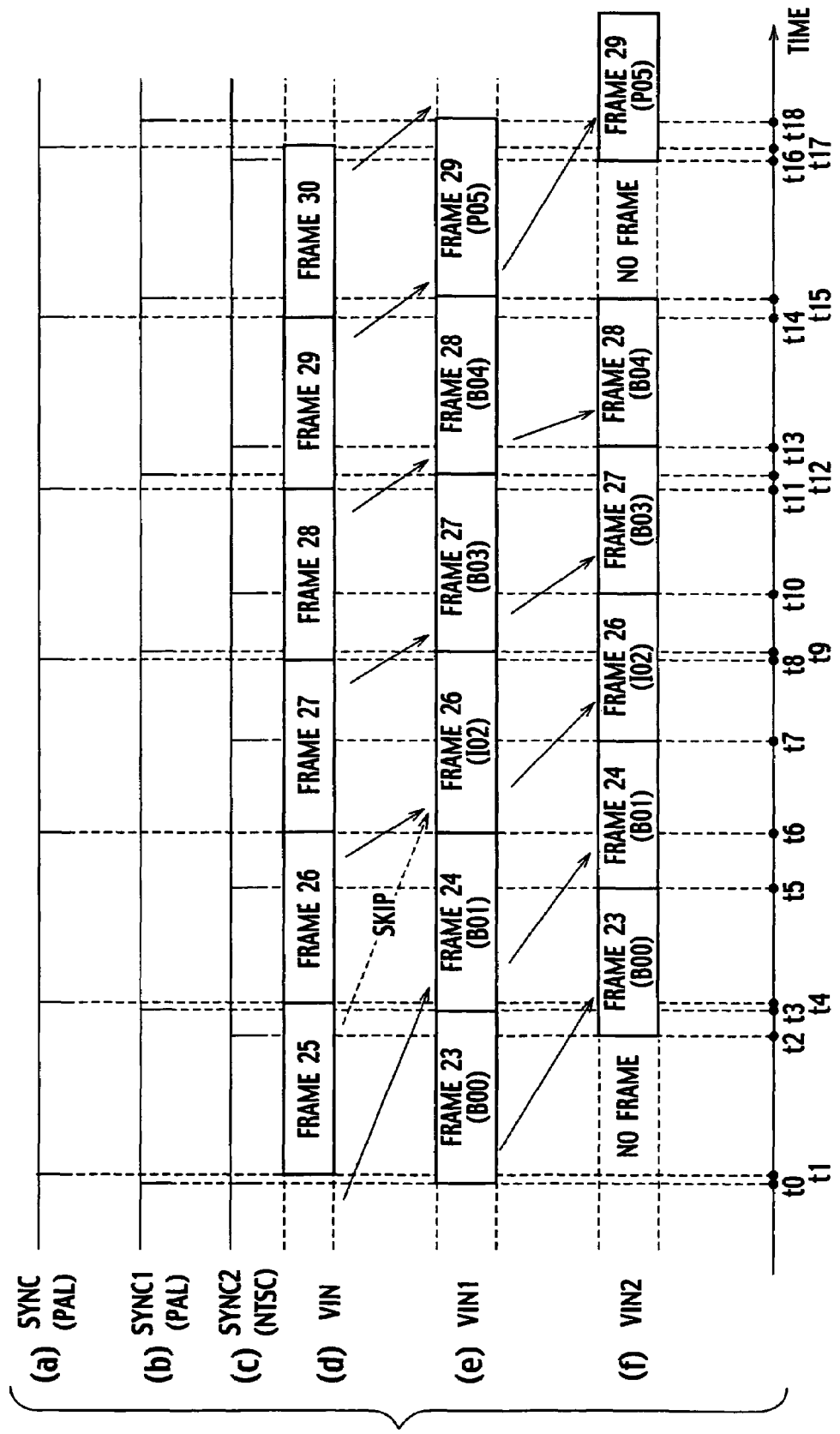
FIG. 3 is a time chart showing operation of first and second synchronizers according to the first embodiment of the present invention.

The time chart of FIG. 3 shows an example in which the input video signal VIN shown in FIG. 3(d) is synchronized with the second internal synchronization signal SYNC2 shown in FIG. 3(c) without changing the frame rate. The input video signal VIN shown in FIG. 3(d) conforms to the PAL standard. The second internal synchronization signal SYNC2 has a synchronization frequency of that of NTSC standard.

The frequency of the input synchronization signal SYNC shown in FIG. 3(a) is higher than the frequency of the first internal synchronization signal SYNC1 shown in FIG. 3(b). That is, although the frequency of the first internal synchronization signal SYNC1 is 25 [Hz], the frequency of the input synchronization signal SYNC is higher than 25 [Hz].

Therefore, the first synchronizer 11 executes a skip operation to the frame 25 at the time t6 of FIG. 3(d) and (e). In a period just before the time t6 of FIG. 3, the first synchronizer 11 holds frames 25 and 26 shown in FIG. 3(d). At time t6 that the first synchronizer 11 should output the frame 25, a frame 27 that is the next frame of the frame 26 is inputted. The first synchronizer 11 outputs the frame 27 by executing a skip operation because the frame 25 becomes unnecessary. As a result, memory capacity of a frame buffer in the first synchronizer 11 is kept constant.

On the other hand, the frequency of the second internal synchronization signal SYNC2 shown in FIG. 3(c) is set to 30 [Hz] which is a synchronization frequency of the NTSC standard. Periods having no frame are inserted to the second internal video signal VIN2 when the second synchronizer 12 synchronizes the first internal video signal VIN1 having the synchronization frequency that conforms to the PAL standard with the second internal synchronization signal SYNC2 having the synchronization frequency that conforms to the NTSC standard, and maintains the frame rate that conforms to the PAL standard, as shown in periods from the time t0 to t2 and from the time t15 to t16 of FIG. 3(f). Each number of frames of the first internal video signal VIN1 and the second internal video signal VIN2 is kept constant in a period that each phase of the first internal synchronization signal SYNC1 and the second internal synchronization signal SYNC2 corresponds, i.e., a period from the time t0 to t15.

As a result, the codec 4 encodes the second internal video signal VIN2 having the synchronization frequency that conforms to the PAL standard, in synchronization with the second internal synchronization signal SYNC2 having the synchronization frequency that conforms to the NTSC standard.

Figure 4:
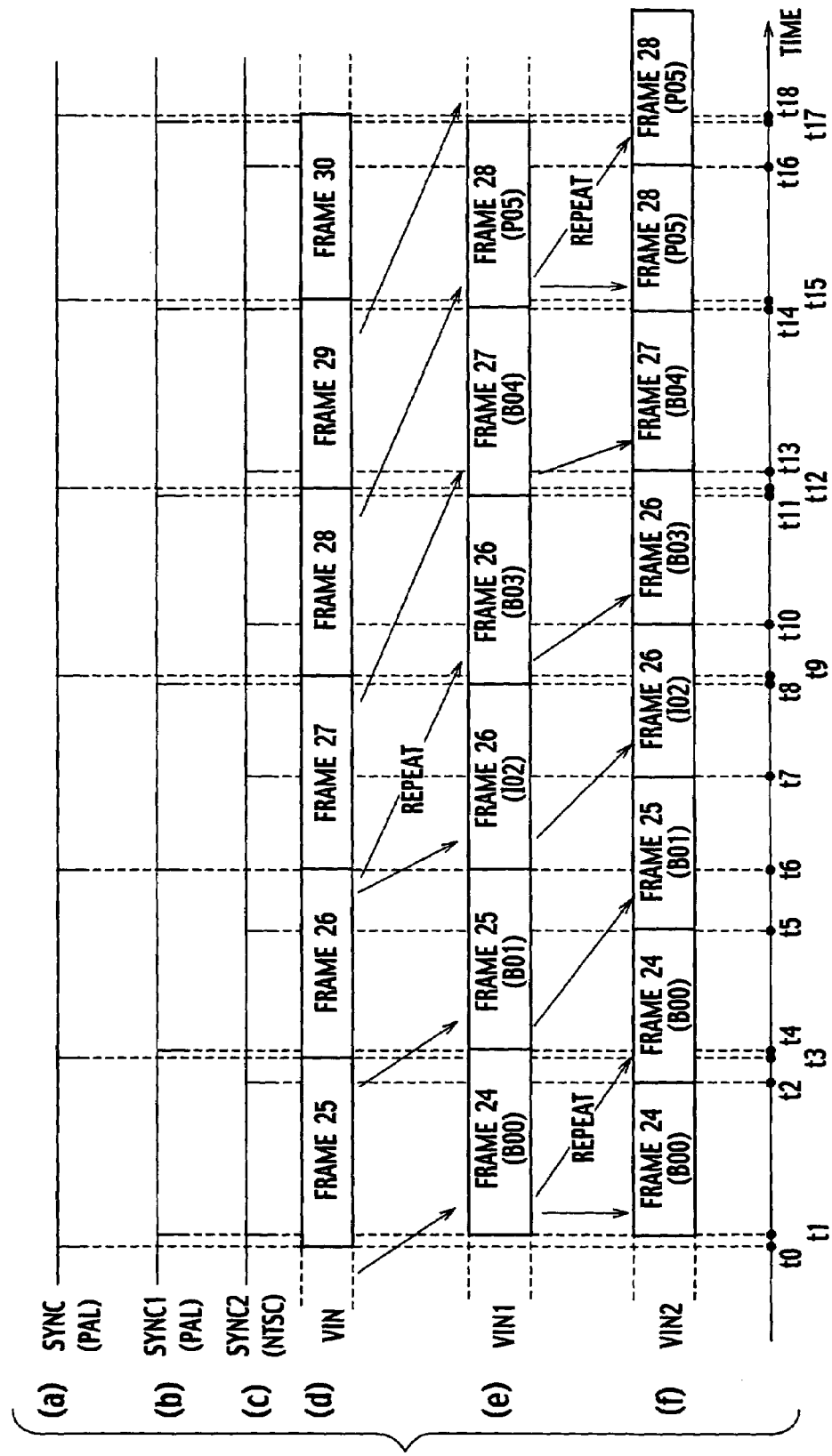
FIG. 4 is a time chart showing operation of first and second synchronizers according to the first embodiment of the present invention.

Next, with respect to the time chart shown in FIG. 4, the description will be given with regard to an example in which the input video signal VIN shown in FIG. 4(d) that conforms to the PAL standard is converted into the frame rate that conforms to the NTSC standard, and is synchronized with the second internal synchronization signal SYNC2 having the synchronization frequency of the NTSC standard.

The frequency of the input synchronization signal SYNC shown in FIG. 4(a) is lower than the frequency of the first internal synchronization signal SYNC1 shown in FIG. 4(b). That is, although the frequency of the first internal synchronization signal SYNC1 is 25 [Hz], the frequency of the input synchronization signal SYNC is lower than 25 [Hz].

Therefore, the first synchronizer 11 executes the repeat operation to the frame 25 at the time t6 of FIG. 4(d) and (e), and maintains the memory capacity of the frame buffer in the first synchronizer 11 to be constant.

When the second synchronizer 12 converts the first internal video signal VIN1 that conforms to PAL standard into the second internal video signal VIN2 having the frame rate and the synchronization frequency of the NTSC standard, the second synchronizer 12 executes the repeat operation to frames of the first internal video signal VIN1, as shown in FIG. 4(f).

The second synchronizer 12 detects a correspondence of each phase of the first internal synchronization signal SYNC1 shown in FIG. 4(b) and the second internal synchronization signal SYNC2 shown in FIG. 4(c), and executes the repeat operation of a frame. As a result, the second synchronizer 12 converts the first internal video signal VIN1 having the frame rate that conforms to the PAL standard into the second internal video signal VIN2 having the frame rate that conforms to the NTSC standard.

Figure 5:
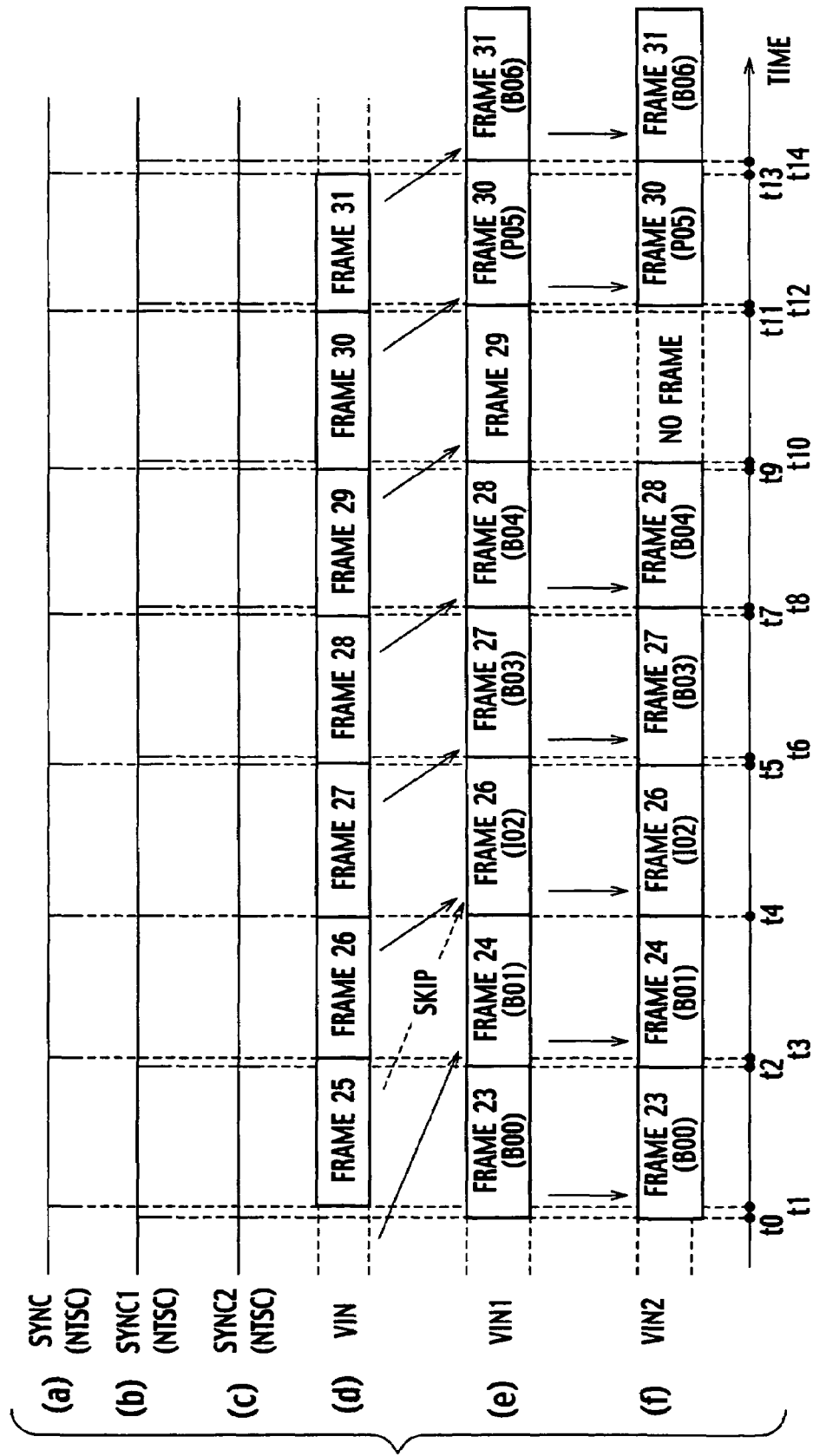
FIG. 5 is a time chart showing operation of first and second synchronizers according to the first embodiment of the present invention.

The time chart of FIG. 5 shows an example in which the input video signal VIN shown in FIG. 5(d) that conforms to the NTSC standard is converted into the frame rate of the PAL standard, and is synchronized with the second internal synchronization signal SYNC2 shown in FIG. 5(c).

The synchronization frequency of the input synchronization signal SYNC shown in FIG. 5(a) is higher than the synchronization frequency of the first internal synchronization signal SYNC1 shown in FIG. 5(b). Therefore, the first synchronizer 11 executes the skip operation to frames of the input video signal VIN so that the memory capacity of the frame buffer in the first synchronizer 11 is kept constant.

A period having no frame is inserted to the first internal video signal VIN1 every six frames when the second synchronizer 12 synchronizes the first internal video signal VIN1 having the synchronization frequency and the frame rate that conform to the NTSC standard with the second internal synchronization signal SYNC2 having the frame rate that conforms to the PAL standard, and maintains the frame rate that conforms to the NTSC standard, as shown in a period from the time t10 to t11 of FIG. 5(f).

As a result, the codec 4 encodes the second internal video signal VIN2 having the frame rate that conforms to the PAL standard, in synchronization with the second internal synchronization signal SYNC2 having the synchronization frequency of the NTSC standard.

Figure 6:
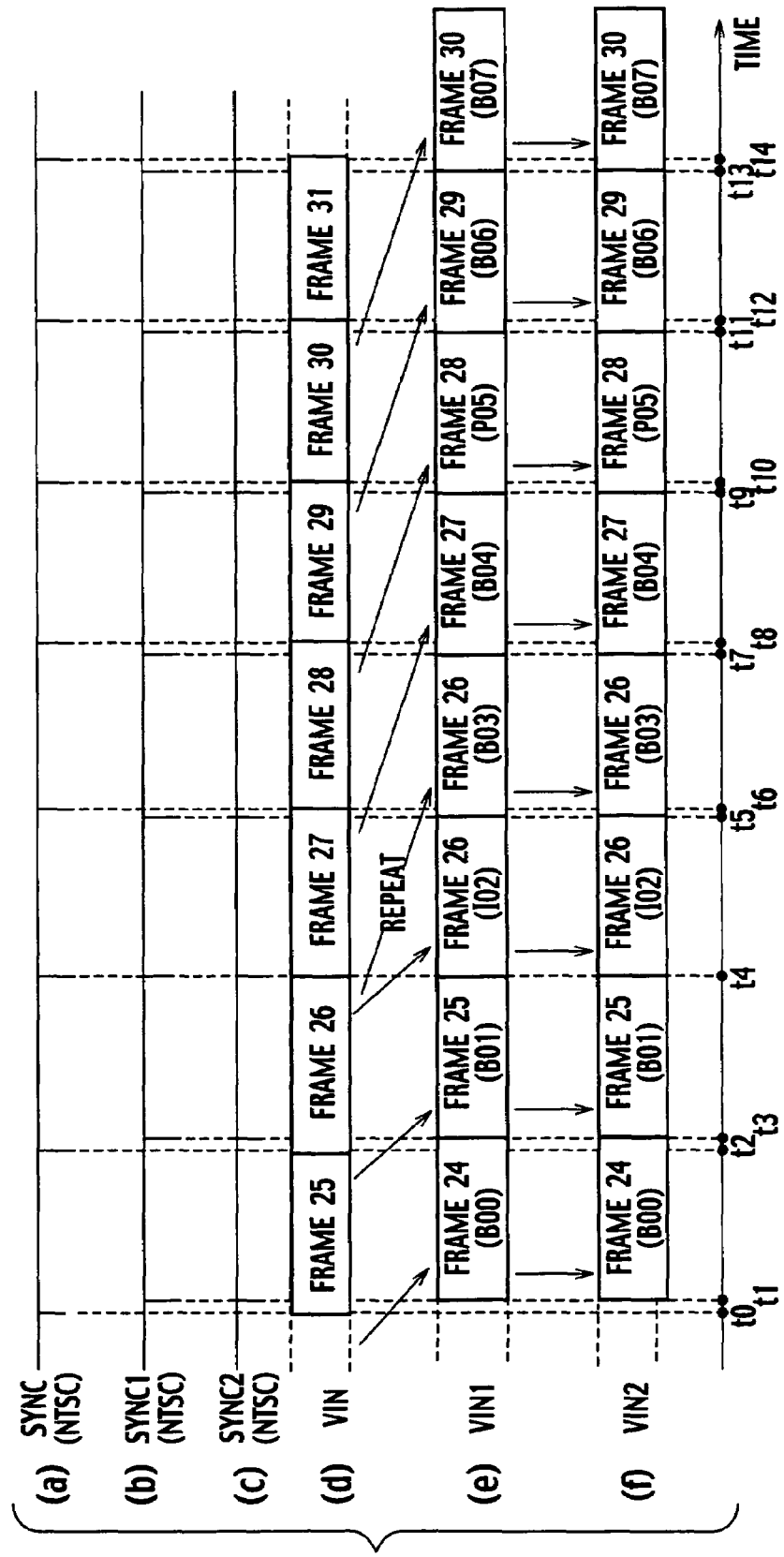
FIG. 6 is a time chart showing operation of first and second synchronizers according to the first embodiment of the present invention.

Next, the time chart of FIG. 6 shows an example in which the input video signal VIN shown in FIG. 6(d) is synchronized with the second internal synchronization signal SYNC2 shown in FIG. 6(c) without changing the frame rate. The input video signal VIN shown in FIG. 6(d) conforms to the PAL standard. The second internal synchronization signal SYNC2 has the synchronization frequency of the NTSC standard.

Next, the time chart shown in FIG. 6 shows an example in which input video signal VIN that conforms to the NTSC standard is synchronized with the second internal synchronization signal SYNC2 having the synchronization frequency that conforms to the NTSC standard without changing the frame rate that conforms to the NTSC standard.

The frequency of the input synchronization signal SYNC shown in FIG. 6(a) is lower than the frequency of the first internal synchronization signal SYNC1 shown in FIG. 6(b). Therefore, the first synchronizer 11 executes the repeat operation to the input video signal VIN, and maintains the memory capacity of the frame buffer in the first synchronizer 11 to be constant. The second synchronizer 12 transmits the second internal video signal VIN2 to the codec 4 without changing when the second synchronizer 12 synchronizes the second internal video signal VIN2 having the frame rate that conforms to the NTSC standard with the second internal synchronization signal SYNC2 having the synchronization frequency that conforms to the NTSC standard.

As described above, the second synchronizer 12 synchronizes the first internal video signal VIN1 with the second internal synchronization signal SYNC2, controls the frame rate of the first internal video signal VIN1, and generates the second internal video signal VIN2. Therefore, it is possible for codec 4 capable of executing encoding and decoding in a manner of time-sharing to encode and decode the encoded video signal BSIN that conforms to the NTSC standard and the input video signal VIN that conforms to the PAL standard, respectively, at the same time. Accordingly, it is possible to provide a video signal processor capable of reducing the hardware scale and the power consumption, and of improving usage compatibility.

SECOND EMBODIMENT

Figure 7:
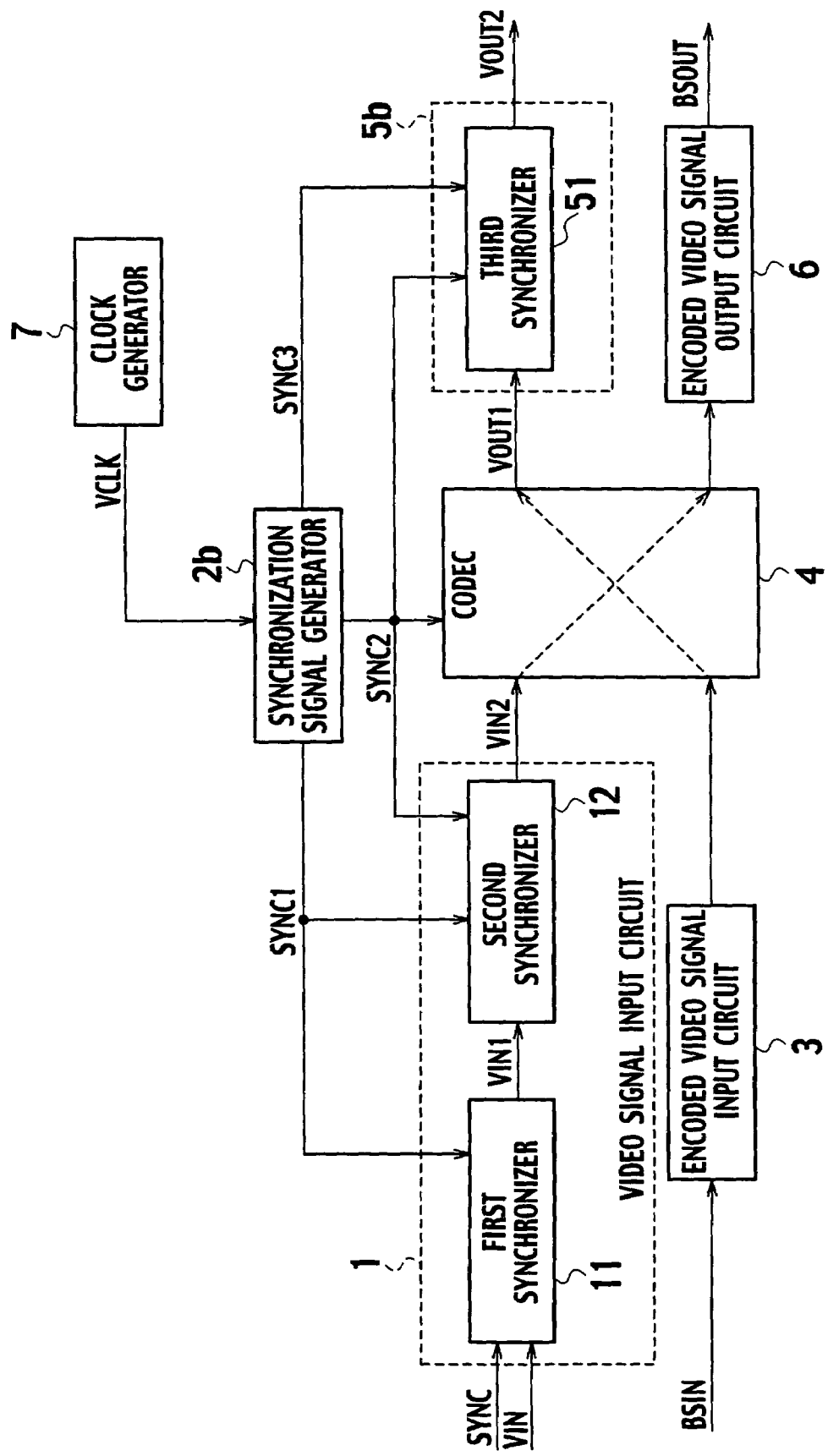
FIG. 7 is a block diagram showing a video signal processor according to a second embodiment of the present invention.

As shown in FIG. 7, a video signal processor according to the second embodiment of the present invention differs from FIG. 1 in that the video signal output circuit 5b includes a third synchronizer 51. The synchronization signal generator 2b further generates a third internal synchronization signal SYNC3 synchronized with the first and second internal synchronization signals SYNC1 and SYNC2. The third synchronizer 51 synchronizes the decoded video signal VOUT1 with the third internal synchronization signal SYNC3, and generates the output video signal VOUT2. That is, the video signal processor shown in FIG. 7 can control the frame rate and the synchronization frequency of the decoded video signal VOUT1. Other arrangements are similar to the video signal processor shown in FIG. 1.

Next, an operation of the video signal processor according to the second embodiment will be described by referring to time charts shown in FIG. 8 to FIG. 11. However, repeated descriptions for the same operation according to the second embodiment which are the same as the first embodiment are omitted.

Figure 8:
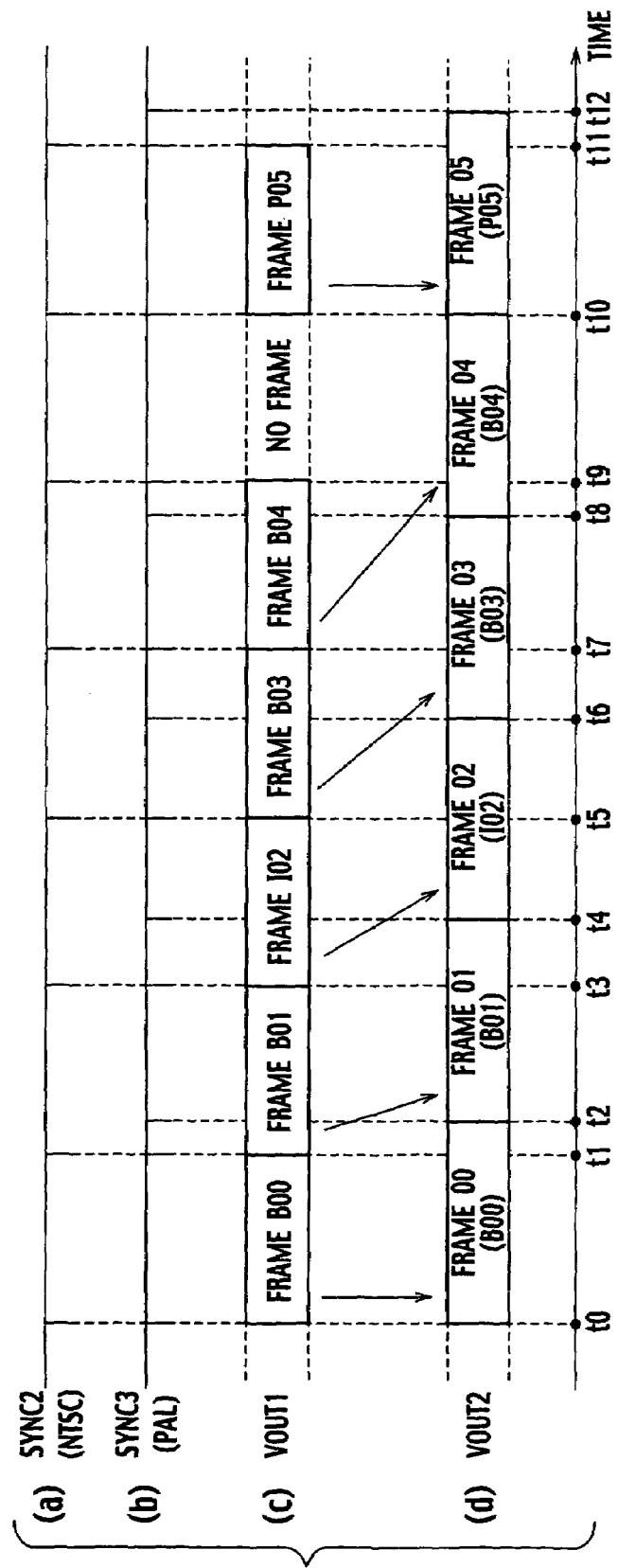
FIG. 8 is a time chart showing operation of a third synchronizer according to the second embodiment of the present invention.

The time chart of FIG. 8 shows an example in which the decoded video signal VOUT1 having the frame rate that conforms to the PAL standard is synchronized with the third internal synchronization signal SYNC3 having the synchronization frequency that conforms to the PAL standard, as shown in FIG. 8(c) and FIG. 8(d).

The codec 4 shown in FIG. 7 decodes the encoded video signal BSIN that conforms to the PAL standard in synchronization with the second internal synchronization signal SYNC2 having the synchronization frequency that conforms to NTSC standard, as shown in FIG. 8(a) and FIG. 8(c).

In this case, third synchronizer 51 synchronizes the decoded video signal VOUT1 with the third internal synchronization signal SYNC3 without executing skip and repeat operations to the decoded video signal VOUT1, as shown in FIG. 8(c) and (d).

Figure 9:
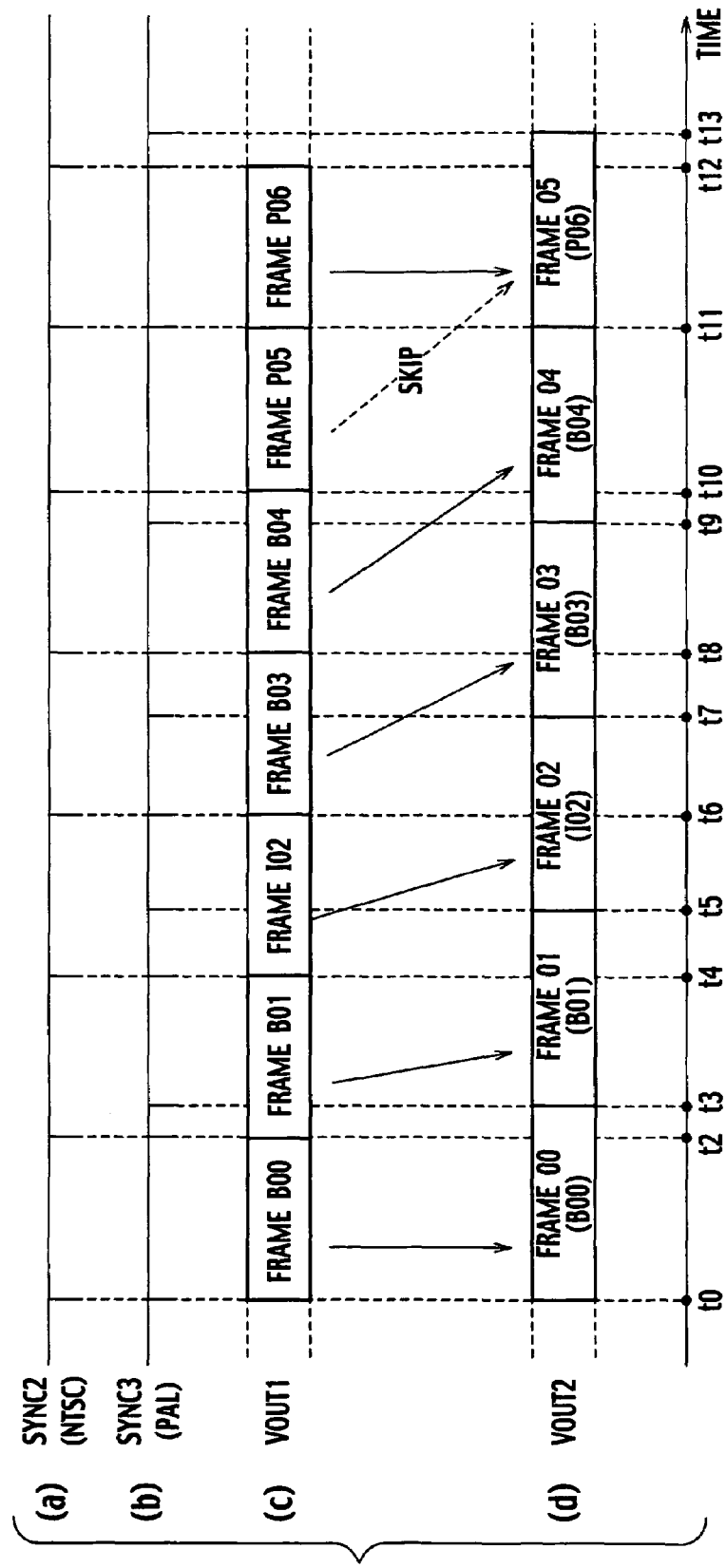
FIG. 9 is a time chart showing operation of the third synchronizer according to the second embodiment of the present invention.

The time chart of FIG. 9 shows an example in which the decoded video signal VOUT1 having the frame rate that conforms to the NTSC standard is synchronized with the third internal synchronization signal SYNC3 having the synchronization frequency that conforms to the PAL standard.

The codec 4 decodes the encoded video signal BSIN that conforms to the NTSC standard in synchronization with the second internal synchronization signal SYNC2 having the synchronization frequency that conforms to NTSC standard. As a result the decoded video signal VOUT1 shown in FIG. 9(c) is generated.

The third synchronizer 51 executes the skip operation to a frame in every six frames of the decoded video signal VOUT1 shown in FIG. 9(c), and converts the decoded video signal VOUT1 having the frame rate that conforms to the NTSC standard into the output video signal VOUT2 having the frame rate that conforms to the PAL standard shown in FIG. 9(d).

Figure 10:
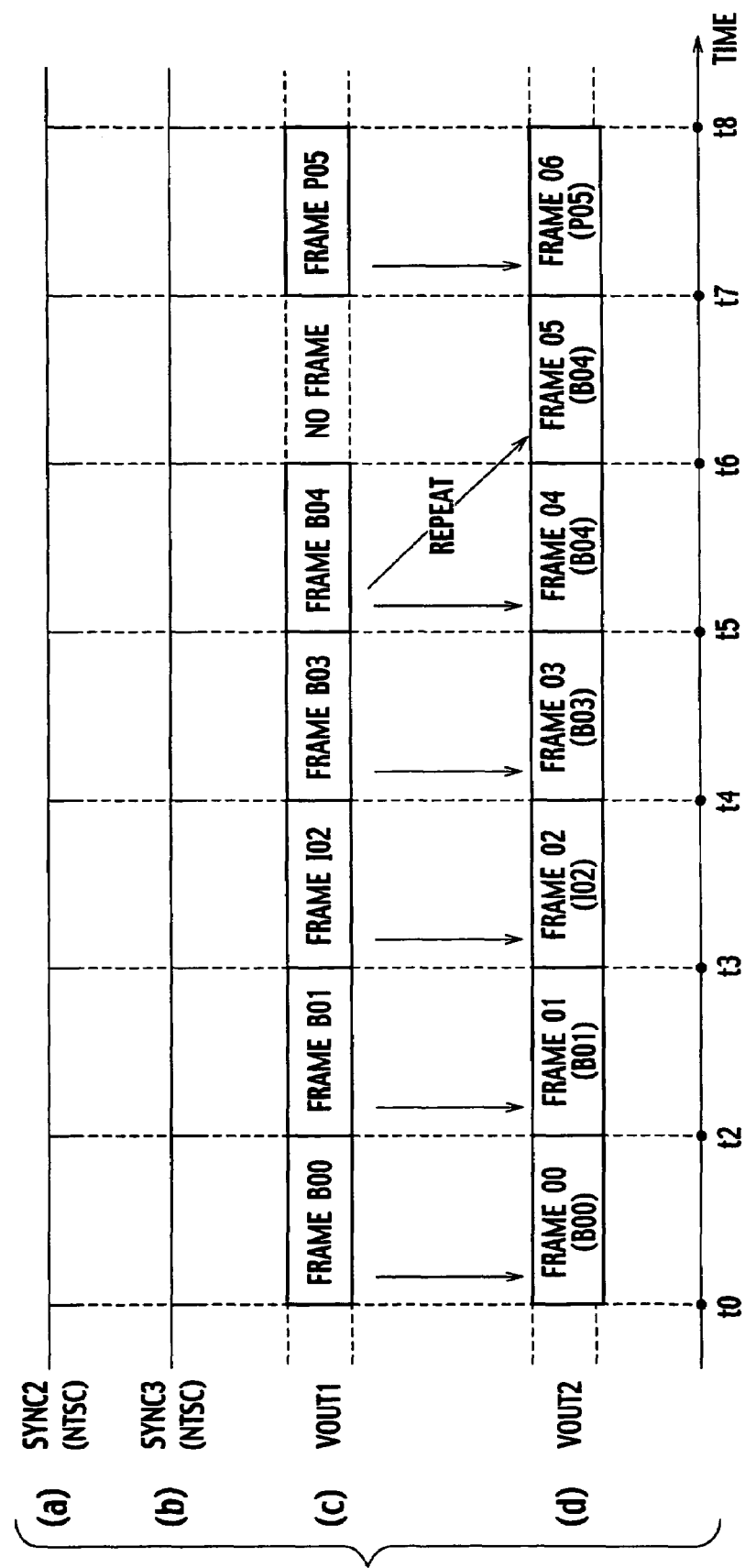
FIG. 10 is a time chart showing operation of the third synchronizer according to the second embodiment of the present invention.

The time chart of FIG. 10 shows an example in which the decoded video signal VOUT1 having the frame rate that conforms to the PAL standard is synchronized with the third internal synchronization signal SYNC3 having the synchronization frequency that conforms to the NTSC standard. The codec 4 decodes the encoded video signal BSIN that conforms to the PAL standard in synchronization with the second internal synchronization signal SYNC2 having the synchronization frequency that conforms to the NTSC standard. As a result the decoded video signal VOUT1 shown in FIG. 10(c) is generated.

The third synchronizer 51 executes a repeat operation to a frame in every five frames of the decoded video signal VOUT1 shown in FIG. 10(c), and converts the decoded video signal VOUT1 having the frame rate that conforms to the PAL standard into the output video signal VOUT2 having the frame rate that conforms to the NTSC standard shown in FIG. 10(d).

Figure 11:
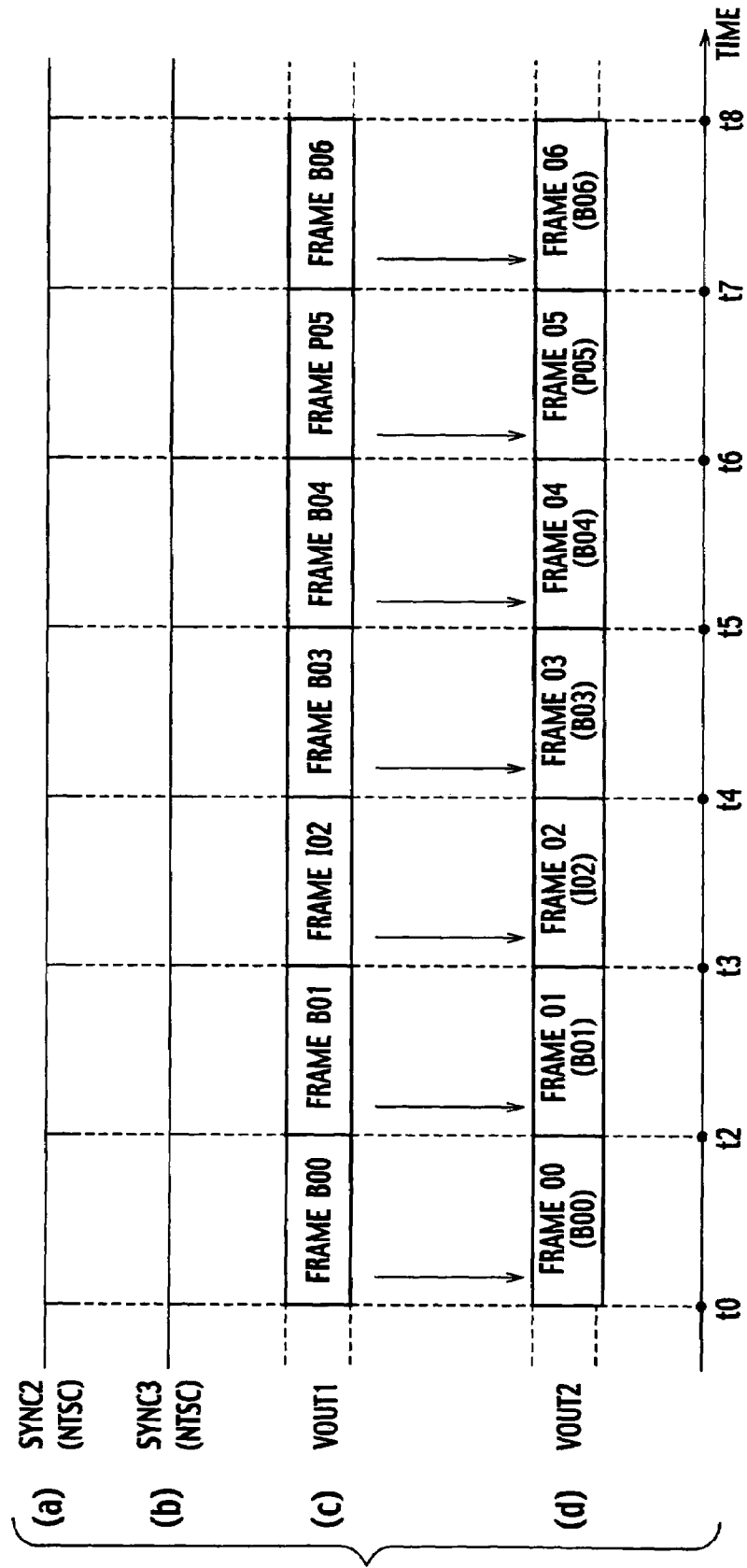
FIG. 11 is a time chart showing operation of the third synchronizer according to the second embodiment of the present invention.

The time chart of FIG. 11 shows an example in which the decoded video signal VOUT1 having the frame rate that conforms to the NTSC standard is synchronized with the third internal synchronization signal SYNC3 having the synchronization frequency that conforms to the NTSC standard. The codec 4 decodes the encoded video signal BSIN that conforms to the NTSC standard in synchronization with the second internal synchronization signal SYNC2 having the synchronization frequency that conforms to NTSC standard. As a result the decoded video signal VOUT1 shown in FIG. 11(c) is generated. In this case, the third synchronizer 51 transmits the decoded video signal VOUT1 to an external device as the output video signal VOUT2 without changing.

As described above, it is possible to treat various standards regardless of the standard of the second internal synchronization signal SYNC2 in encoding and decoding, according to the second embodiment. Therefore, it is possible to convert- ing the input video signal VIN that conforms to the PAL standard into the frame rate that conforms to the NTSC stan- dard before encoding, and to convert the encoded video signal BSIN into the frame rate that conforms to the PAL standard after decoding, for instance. As a result, it is possible to record in a recording device by converting the input video signal VIN that conforms to the PAL standard into the NTSC standard, and to display by converting the encoded video signal BSIN that conforms to the NTSC standard into the PAL standard. Accordingly, a video signal processor having a high compatibility, compared with the video signal processor shown in FIG. 1, can be achieved.

OTHER EMBODIMENTS

Various modifications will become possible for those skilled in the art after receiving the teachings of the present disclosure without departing from the scope thereof.

The video signal processor according to the aforementioned first and second embodiments can be formed as a semiconductor integrated circuit by integrating on a semiconductor chip. The video signal processor according to the first and second embodiments can be applied to various products, such as a HDD recorder, a DVD recorder, and a DVD recorder with HDD.

The description has been given with regard to an example in which a MPEG codec is utilized as the codec 4. However, a codec capable of executing encoding and decoding in a designated time partition within each cycle of the synchronization signal can be utilized as the codec 4 without limiting to the MPEG codec.

In the first and second embodiments, the PAL standard is explained as a standard having 25 [Hz] synchronization frequency. However, the SECAM standard, the PAL-M standard, or the PAL-N standard can be utilized instead of the PAL standard.

What is claimed is:

1. A video signal processor comprising:
 a synchronization signal generator configured to generate a first internal synchronization signal corresponding to a standard of an input video signal, and to generate a second internal synchronization signal synchronized with the first internal synchronization signal;
 a first synchronizer configured to synchronize the input video signal with the first internal synchronization signal, and to generate a first internal video signal;
 a second synchronizer configured to synchronize the first internal video signal with the second internal synchronization signal, and to generate a second internal video signal by controlling the frame rate of the first internal video signal; and
 a codec configured to execute both decoding of an encoded video signal and encoding of the second internal video signal in designated time partitions within each cycle of the second internal synchronization signal.

2. The video signal processor of claim 1, wherein one of a frame synchronization signal and a field synchronization signal is utilized as the first and second internal synchronization signals.

3. The video signal processor of claim 1, further comprising a clock generator configured to supply a reference clock that is a reference of the first and second synchronization signals to the synchronization signal generator.

4. The video signal processor of claim 1, further comprising:
 an encoded video signal input circuit configured to receive the encoded video signal from an external device, and to transmit the encoded video signal to the codec; and an encoded video signal output circuit configured to transmit the second internal video signal encoded by the codec to a external device.

5. The video signal processor of claim 1, wherein the first synchronizer executes a skip operation to at least one frame of the input video signal when a synchronization frequency of the input video signal is higher than a frequency of the first internal synchronization signal.

6. The video signal processor of claim 1, wherein the first synchronizer executes a repeat operation to at least one frame of the input video signal when a synchronization frequency of the input video signal is lower than a frequency of the first internal synchronization signal.

7. The video signal processor of claim 1, wherein the second synchronizer controls the frame rate of the first internal video signal by executing one of a repeat operation and a skip operation to a frame of the first internal video signal at a timing that each phase of the first and second synchronization signals corresponds.

8. The video signal processor of claim 1, wherein the input video signal conforms to one of PAL and SECAM standards, and a frequency of the second synchronization signal is set to a synchronization frequency that conforms to a NTSC standard.

9. The video signal processor of claim 8, wherein the second synchronizer inserts periods having no frame into the second internal video signal when either frame rate of the PAL and SECAM standards is maintained.

10. The video signal processor of claim 8, wherein the second synchronizer executes a repeat operation to at least one frame of the second internal video signal when either frame rate of the PAL or SECAM standards is converted into a frame rate that conforms to the NTSC standard.

11. The video signal processor of claim 1, wherein the input video signal conforms to a NTSC standard, and a frequency of the second synchronization signal is set to a synchronization frequency that conforms to the NTSC standard.

12. The video signal processor of claim 8, wherein the second synchronizer inserts periods having no frame into the second internal video signal when a frame rate of the NTSC standard is converted into either frame rate of the PAL and SECAM standards.

13. The video signal processor of claim 8, wherein the second synchronizer transmits the first internal video signal to the codec as the second internal video signal without changing when a frame rate of the NTSC standard is maintained.

14. The video signal processor of claim 1, wherein the synchronization signal generator further generates a third internal synchronization signal synchronized with the first and second internal synchronization signals.

15. The video signal processor of claim 14, further comprising a third synchronizer configured to synchronize a decoded video signal with the third internal synchronization signal, and to generate an output video signal.

16. The video signal processor of claim 15, wherein the second synchronization signal is set to a synchronization frequency that conforms to NTSC standard, and the third synchronization signal is set to a synchronization frequency that conforms to one synchronization frequency of PAL and SECAM standards.

17. The video signal processor of claim 15, wherein the third synchronizer executes a skip operation to at least one frame of the decoded video signal when the decoded video signal having a frame rate that conforms to the NTSC standard is converted into a frame rate that conforms to one of the PAL and SECAM standards.

18. The video signal processor of claim 15, wherein the second and third synchronization signals are set to a synchronization frequency that conforms to NTSC standard.

19. The video signal processor of claim 18, wherein the third synchronizer executes a repeat operation to at least one frame of the decoded video signal when the decoded video signal having a frame rate that conforms to one of PAL and SECAM standards is converted into a frame rate that conforms to the NTSC standard.

20. A method for processing a video signal, comprising:
generating a first internal synchronization signal corresponding to a standard of an input video signal;
generating a second internal synchronization signal synchronized with the first internal synchronization signal;
generating a first internal video signal by synchronizing the input video signal with the first internal synchronization signal;
synchronizing the first internal video signal with the second internal synchronization signal;
generating a second internal video signal by controlling the frame rate of the first internal video signal; and
executing both decoding of an encoded video signal and encoding of the second internal video signal in designated time partitions within each cycle of the second internal synchronization signal.

* * * * *